United States Patent [19]

Takao et al.

[11] Patent Number: 5,724,029
[45] Date of Patent: Mar. 3, 1998

[54] COMMUNICATION INTERCONNECTION DEVICE WITH PROCESSING INTERRUPT BASED ON TOKEN ADDRESS

[75] Inventors: Noriyuki Takao; Hidetoshi Takano, both of Toyota; Sakae Ito; Naoki Okamura, both of Nara, all of Japan

[73] Assignees: Toyota Jidosha Kabushiki Kaisha, Toyota; Sharp Kabushiki Kaisha, Osaka, both of Japan

[21] Appl. No.: 544,211

[22] Filed: Oct. 17, 1995

Related U.S. Application Data

[63] Continuation of Ser. No. 268,607, Jun. 30, 1994, abandoned.

[30] Foreign Application Priority Data

Jun. 30, 1993 [JP] Japan ................................. 5-159884

[51] Int. Cl.$^6$ ................................................. H04L 12/56
[52] U.S. Cl. ............................. 340/825.5; 340/825.52; 395/200.8; 370/439; 364/242.1; 364/941.1; 364/941.7
[58] Field of Search ...................... 340/825.5, 825.52; 370/439, 402; 395/200.8; 364/230.2, 242.1, 941, 941.1, 941.7

[56] References Cited

U.S. PATENT DOCUMENTS

| | | | |
|---|---|---|---|
| 4,819,229 | 4/1989 | Pritty et al. | 340/825.5 X |
| 4,937,815 | 6/1990 | Lighthart | 370/439 |
| 5,107,456 | 4/1992 | Schuur | 395/310 |
| 5,276,681 | 1/1994 | Tobagi et al. | 370/85.4 |
| 5,289,469 | 2/1994 | Tanaka | 370/85.4 |

FOREIGN PATENT DOCUMENTS

| | | |
|---|---|---|
| 064 347 | 11/1982 | European Pat. Off. |
| 3-44234(A) | 2/1991 | Japan . |
| 3-44236 | 2/1991 | Japan . |
| 3-127104(A) | 5/1991 | Japan . |
| 4-108238(A) | 4/1992 | Japan . |
| 92/15162 | 9/1992 | WIPO . |

OTHER PUBLICATIONS

"Token Ring Access Method and Physical Layer Specifications" ANSI/IEEE Standard 802.5, 1985, Mar. 1985 New York US pp. 27–30, 41.

"Token-Passing Bus Access Method and Physical Layer Specifications" ANSI/IEEE Standard 820.4, 1985, Dec. 1984, New York US, pp. 50–51, 88.

*Primary Examiner*—Michael Horabik
*Assistant Examiner*—William H. Wilson, Jr.
*Attorney, Agent, or Firm*—Kenyon & Kenyon

[57] ABSTRACT

A communication control section is provided with a plurality of receiving channels (RXDA1 and RXDA2). An address separated by an address separating section constituting the RXDA1 is compared with a reference address denoting a token, and if the separated address corresponds thereto, an interruption is requested by an interruption processing section. An address separated by an address separating section constituting the RXDA2 is compared with a reference address denoting the station number of that particular station, and if the separated address corresponds thereto, the interruption is similarly requested. When the interruption has been requested, the processing of a CPU transfers from the processing of a main routine by a main routine processing section to an interruption processing by an interruption processing section.

4 Claims, 6 Drawing Sheets

COMMUNICATION INTERCONNECTION DEVICE WITH PROCESSING INTERRUPT BASED ON TOKEN ADDRESS

This application is a continuation of application Ser. No. 08/268,607, filed 30 Jun. 1994, now abandoned.

BACKGROUND OF THE INVENTION (i) Field of the Invention

The present invention relates to a communication device for use in communication between, for example, programmable controllers.

(ii) Description of the Prior Art

Figure 5A:
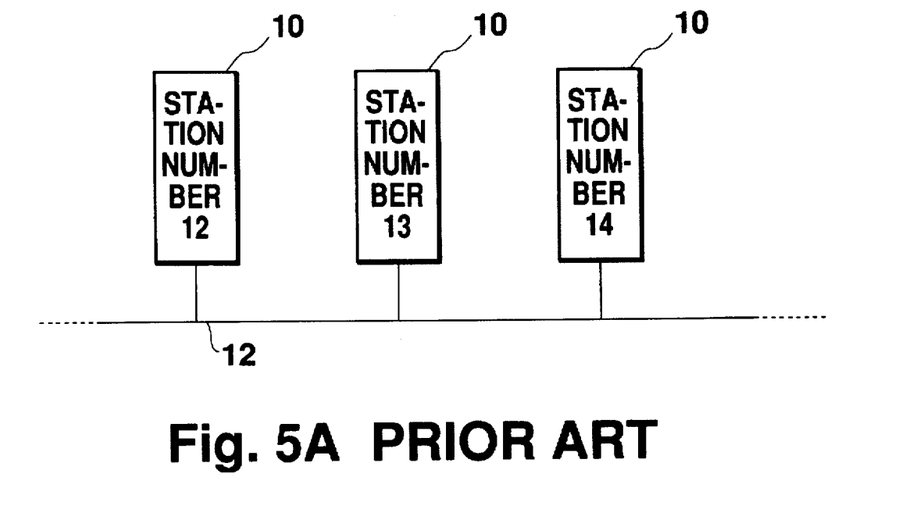
FIG. 5A shows one exemplary constitution of a system involving control by a token.

As a technique for preventing transmitted data from colliding on a communication medium in a network constituting a plurality of communication devices (stations), there is, for example, control by a token. FIG. 5A shows one constitutional embodiment of a system using such control and FIG. 5B shows the constitution of frames in this system, while FIG. 6 shows frame formats of the token and data in this system.

In the system shown in FIG. 5A, a plurality of stations 10 to which station numbers 12, 13, 14 ... are attached are connected to a communication line 12. Each station 10 acquires a data transmission right, when it has received the token addressed to itself from another station via the communication line 12. The station 10 which has acquired the data transmission right transmits the data through the communication line 12 to other stations, and then transmits the token to the next station 10 via the communication line 12 after the data transmission has finished. As is apparent from the foregoing, in the data transmission system using token passing, the token is circulated through the respective stations 10 to carry out acquisition and transfer of the transmission right, so that the collision of the data on the communication line 12 can be prevented. A frame regarding the data which are transmitted among the respective stations 10 is usually called an LLC (logical link control) data frame, and another frame regarding the control of a medium (the communication line 12), such as the token, is called an MAC (media access control) frame.

Figure 5B:
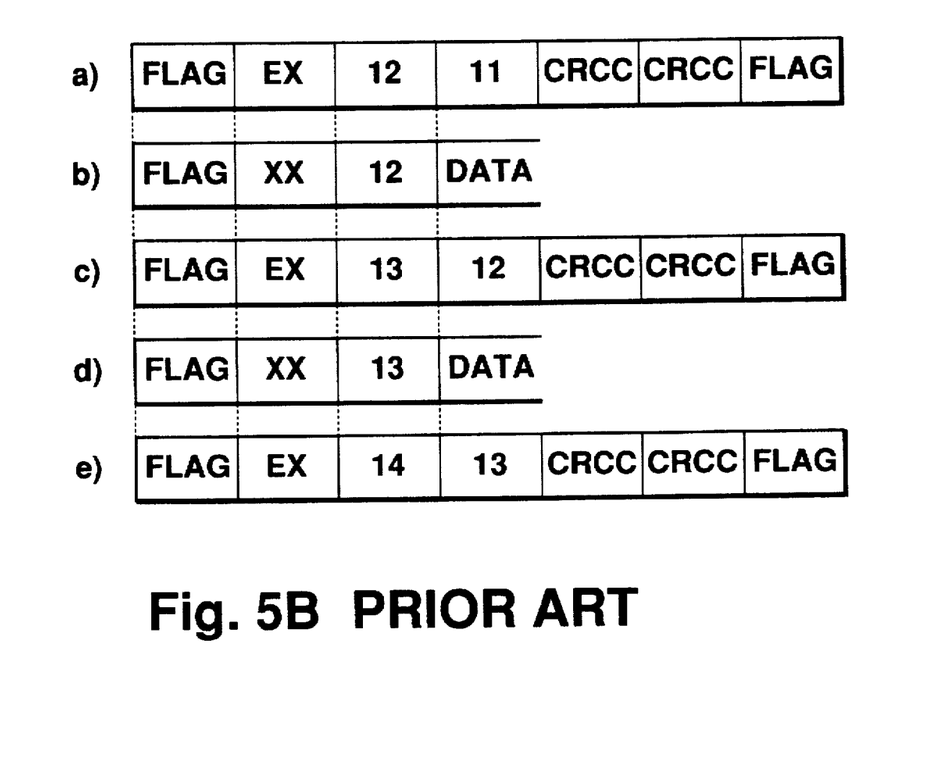
FIG. 5B shows the constitution of frames.
Figure 6:
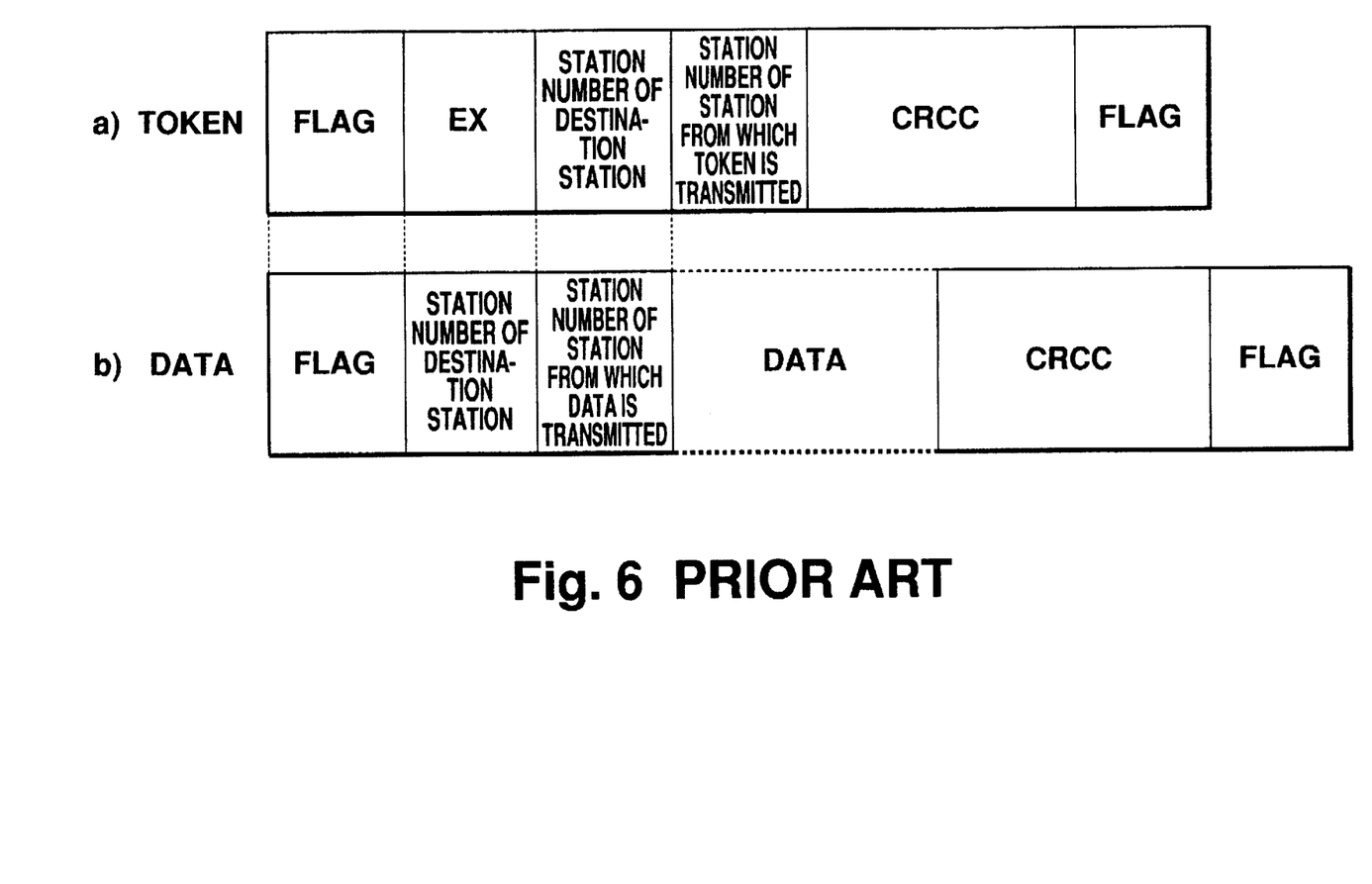
FIG. 6 shows one example of each frame format of the token and data.

For example, when having received a frame shown in FIG. 5B a), the station 10 having the station number 12 acquires the token. As shown generically in FIG. 6 a), the frame regarding the token has flags (each 1 byte) regarding HDLC (high level data link control) procedure at the head and tail thereof, and it further contains a hexadecimal code (EX wherein X is optional) denoting the token, the station number of the destination station, the station number of the station from which the transmission is made, and CRC (cyclic redundancy check) code (each 1 byte). The frame shown in FIG. 5B a), which station number 12 has received is, a frame regarding the token transmitted from the station number 11 to the station number 12, and so the station number 12 acquires the token. The station number 12 which has acquired the token transmits the data in the form of a frame shown in FIG. 5B b). The frame regarding the data, as shown in FIG. 6 b), has flags regarding the HDLC procedure at the head and tail thereof, and it further contains the station number of the destination station, the station number of the station from which the transmission is made, the data and the CRC code. After having transmitted the data in the form of the frame shown in FIG. 5B b), station number 12 transfers the transmission right to station number 13 by transmitting the token in the form of a frame shown in FIG. 5B c). The station number 13 which has acquired the token transmits the data in the form of a frame shown in FIG. 5B d), and then transmits the token in the form of a frame shown in FIG. 5B e) to the next station, i.e., station number 14.

In order to achieve the above-mentioned control by the use of the token, each station 10 has a function for judging whether or not the frame regarding the token or the data received via the communication line 12 is addressed to itself. For example, as shown in Japanese Patent Application Laid-open No. Hei 3-44236, the judgement as to whether or not the frame is addressed to that station can be made by software processing.

However, in the conventional technique having such a constitution, an interrupt is often generated to the processing means (CPU) constituting the respective stations, so that the throughput of the processing means disadvantageously deteriorates. That is, the frame transmitted through the communication line is received by a single receiving channel of each station, and in compliance with this receive action, the interrupt is generated to the processing means, such as a CPU. Responding to the interrupt request, the CPU checks the address region at a predetermined position (e.g., the second byte in an embodiment in FIG. 6) of the received frame by software means. As a result of this check, only when the information stored in this address region corresponds to its own station number or a specific address (EX) representing the token, does the CPU execute processes corresponding to the data or the token. If the information stored in this address region does not correspond to its own station number or the specific address regarding the token, the processing means discontinues the receiving operation or abandons the received data.

As described above, in the conventional technique, the interrupt must be generated to check the station number even in the case of the frame regarding the data or the token for a different station, and because of this, performance has been noticeably poor.

SUMMARY OF THE INVENTION

Objects of the present invention are to relieve the load on the processing means and to improve the processing performance of a device by inhibiting the generation of an interrupt request to the processing means in the case that a frame regarding a received token or data is addressed to a different station.

A communication device regarding the first aspect of the present invention is directed to a communication device used as at least one of a plurality of stations constituting a communication network, wherein the communication device comprises:

(a) processing means for conducting communication processing; and (b) interrupt means for generating interrupt processing to the processing means; said interrupt means including;

(b1) a first communication channel, in connection with a communication medium for judging whether or not a frame received through the communication medium is a media access control (MAC) frame for the maintenance and control of normal communication;

(b2) a second communication channel, in connection with the communication medium, for judging whether or not the frame received through the communication medium is a logical link control (LLC) data frame for data transmission addressed to the communication device; and (b3) interrupt request means for requesting, from the processing means, the interrupt processing regarding the MAC frame in the case that the frame received through the communication medium is judged to be the MAC frame by the first communication channel, or the interrupt processing regarding the LLC data frame received by the second communication channel in the case that the frame received through the communication medium is judged to be the LLC frame by the second communication channel.

An interrupt receiving method regarding the second aspect of the present invention is directed to an interrupt receiving method conducted by at least one of a plurality of stations constituting a communication network, the method comprising:

(a) a step of receiving a frame through a communication medium by first and second communication channels constituting the same station;

(b) a step of judging whether or not the frame received through the communication medium is an MAC frame by the first communication channel;

(c) a step of judging whether or not the frame received through the communication medium is an LLC data frame addressed to the station including the first and second communication channels by the second communication channel; and (d) a step of requesting, through processing means for conducting a communication processing, the interrupt processing regarding the MAC frame in the case that the frame received through the communication medium is judged to be the MAC frame by the first communication channel, or the interrupt processing regarding the LLC data frame in the case that the frame received through the communication medium is judged to be an LLC frame by the second communication channel.

In the present invention, the interrupt processing is requested from the processing means, only when the frame received from the communication medium meets predetermined conditions. This condition is that the frame received from the communication medium is an LLC data frame addressed to that station or is the MAC frame which all the stations taking part in the communication generally receive. That is, the interrupt processing is requested from the processing means, only when an LLC data frame addressed to that station, or the MAC frame is received. The reason why such processing is possible is that the first and second channels are provided as communication channels in one station or communication device and it is judged by each communication channel whether or not the interrupt is necessary. That is, since the need for the interrupt is judged by each channel, it is no longer necessary to interrupt the processing means with frame which need not be processed by that station, so that the processing performance of the whole device can be improved.

The necessity of the interrupt is judged by comparing a destination address contained in the frame on the communication medium with first and second reference addresses set by the processing means. As the first reference address, a specific address indicating the MAC frame is set, and as the second reference address, an own station address, inherent in the each station itself, is set. In the first communication channel, the destination address is separated from the MAC frame, and this destination address is then compared with the first reference address to judge whether or not the received frame is the MAC frame. In the second communication channel, the destination address is separated from the LLC data frame, and this destination address is then compared with the second reference address to judge whether or not the received frame is the LLC data frame addressed to that station.

Furthermore, the communication device of the present invention can be used for communication between application control devices such as programmable controllers. In such a use, when no interruption request is generated, the processing means executes usual processing inclusive of reception and transmission of commands and data between the processing means and the application device as well as the analysis of the commands and data. Once the interrupt processing is requested, the processing means discontinues the usual processing and executes reception processing. In the reception processing, there are conducted at least the extraction of the data from the received frame and the processing of the preparation for the subsequent reception processing.

DETAILED DESCRIPTION OF PREFERRED EMBODIMENT

Next, the present invention will be described in detail with reference to suitable examples. The present invention can be carried out in accordance with a system constituted as shown in FIG. 5A, and therefore in the following description, symbols in FIG. 5A will also be referred to.

Figure 1:
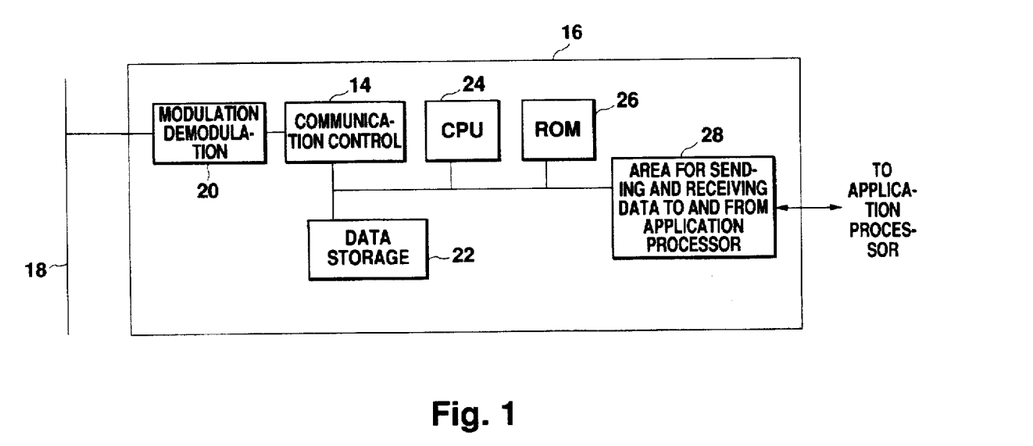
FIG. 1 is a block diagram showing the constitution of a communication device regarding one embodiment of the present invention.

FIG. 1 shows the constitution of a communication device 16 regarding one embodiment of the present invention in which an LSI for communication is mounted as a communication control section 14.

The communication device 16 shown in this drawing can be used as each station 10 in the system constitution in FIG. 5A, and it is connected to a communication line 18. This communication device 16 is constituted of a modulation/demodulation section 20, a communication control section 14, a data storage section 22, a CPU 24, a ROM 26 and an area 28 for sending and receiving data to and from an application processor. The modulation/demodulation section 20 demodulates a frame regarding a token or data from a signal input through the communication line 18 at the time of receiving, and feeds the demodulated frame to the communication control section 14. This communication control section 14 detects an address from the frame demodulated by the modulation/demodulation section 20, and then generates an interrupt request to the CPU 24, when this address meets certain conditions. The CPU responds to this request to discontinue the processing, and then stores the information constituting the frame received via the modulation/demodulation section 20 in the data storage section 22. The ROM 26 is memory means for storing the operation program of the CPU 24. The area 28 for sending and receiving the data to and from the application processor, is a memory area for sending and receiving communication data to and from the application processor, for example, a processor of a programmable controller. The CPU 24 carries out predetermined processing on the received information stored in the data storage section 22, and then writes the processed information into the area 28 for sending and receiving the data to and from the application processor.

Figure 2:
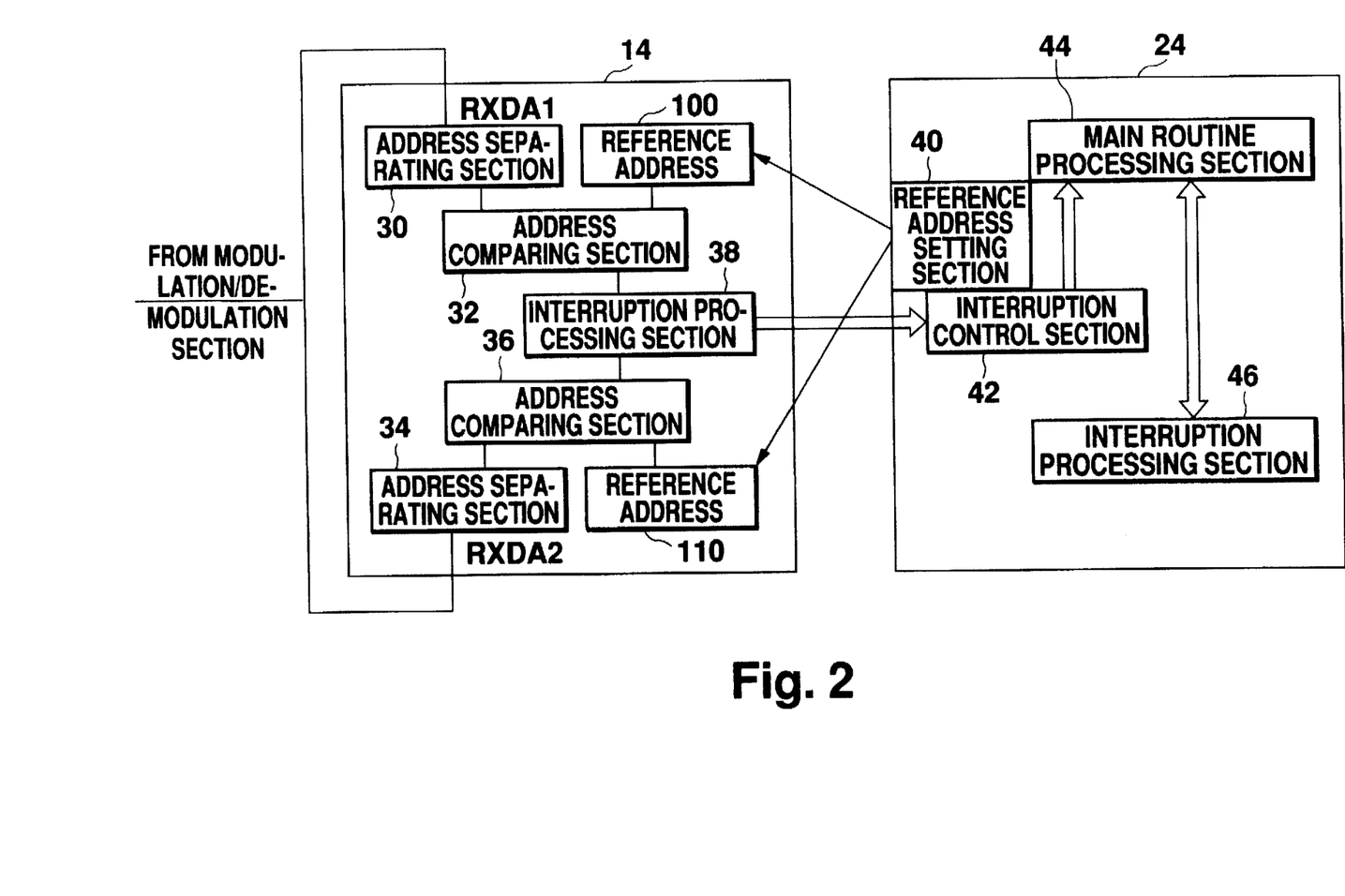
FIG. 2 is a block diagram showing the constitution of a communication control section and a CPU in the embodiment of FIG. 1.

FIG. 2 shows the constitution of the communication control section 14 and the CPU 24 in this embodiment.

As shown in this drawing, the communication control section 14 is equipped with two receiving channels RXDA1 and RXDA2. These receiving channels RXDA1 and RXDA2 are both connected to the communication line 18 via the modulation/demodulation section 20. The receiving channel RXDA1 is constituted of an address separating section 30 and an address comparing section 32, and the receiving channel RXDA2 is constituted of an address separating section 34 and an address comparing section 36. The communication control section 14 further has an interrupt processing section 38.

Figure 3A:
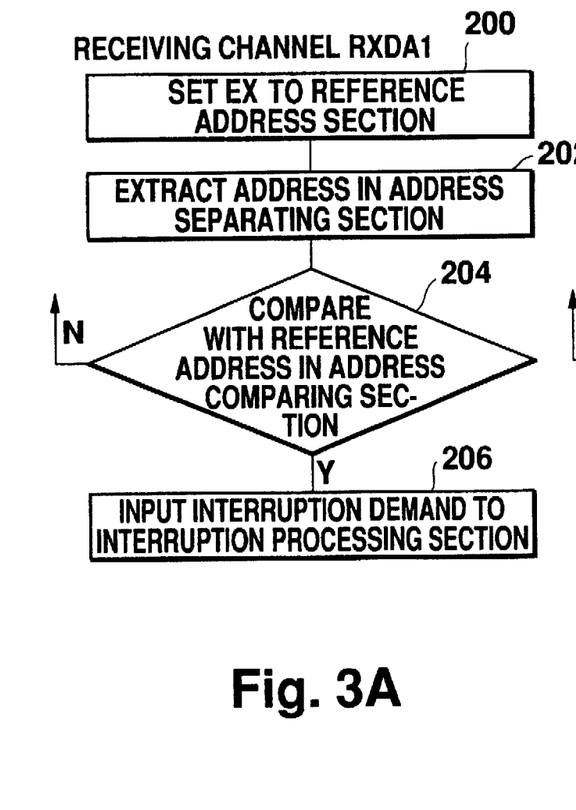
FIGS. 3A and 3B are flow charts showing the operation sequence of the communication control section in the embodiment of FIG. 1.
Figure 3B:
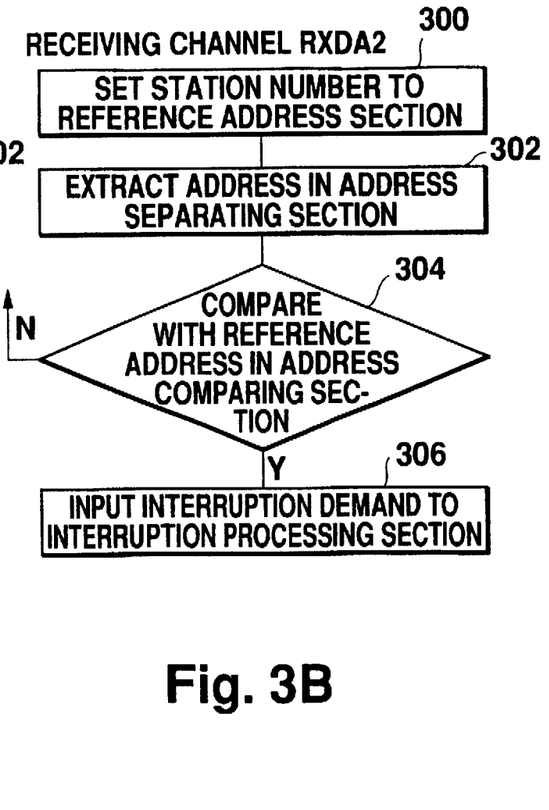
Figure 4:
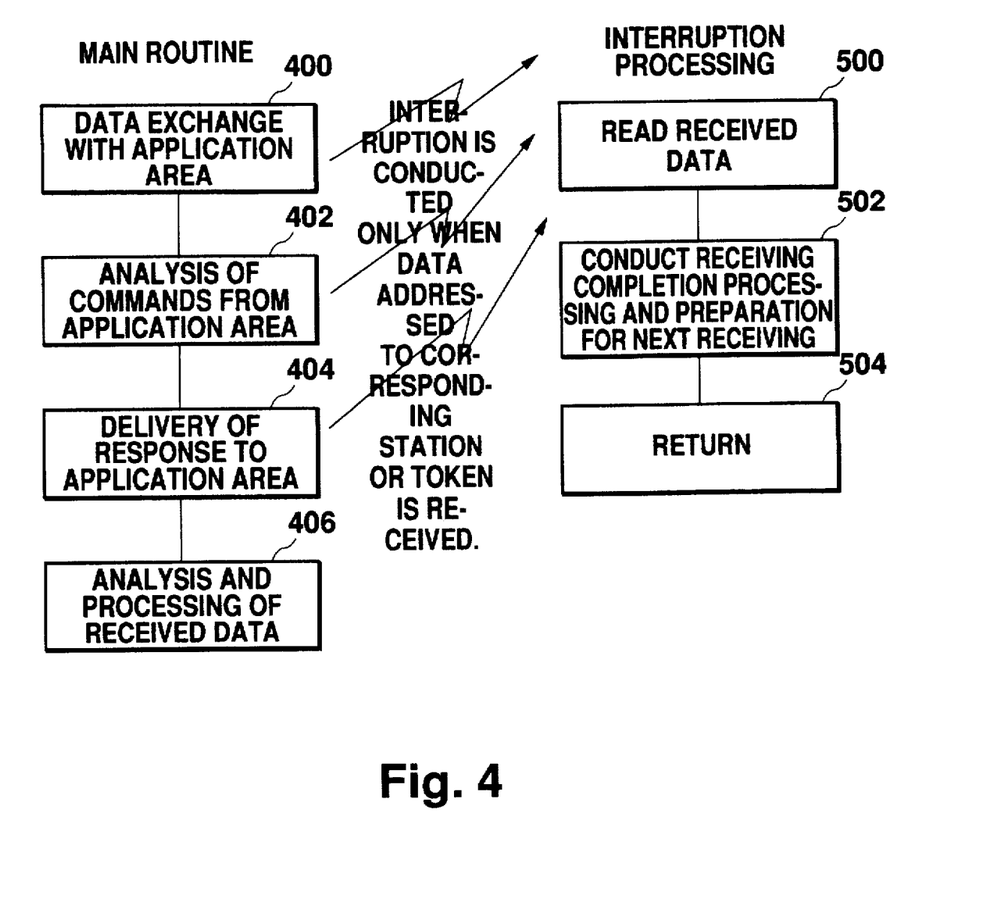
FIG. 4 is a flow chart showing the operation sequence of the CPU in the embodiment of FIG. 1.

FIGS. 3A, 3B and 4 show the operation sequence of the communication control section 14 and the CPU 24 in this embodiment. As shown in FIGS. 3A and 3B, each of the address separating sections 30 and 34 extracts the address region of the frame demodulated by the modulation/demodulation section 20, for example, the second byte of a frame constitution shown in FIG. 6 (step 202 or 302). Each of the address comparing sections 32 and 36 compares an address separated by the corresponding address separating section 30 or 34 with a reference address 100 or 110 (step 204 or 304). As the reference address 100 or 110, a predetermined address is set by a reference address setting section 40 of the CPU 24, prior to the step 202 to 302 (step 200 or 300). That is, EX denoting the token is set as the reference address corresponding to the receiving channel RXDA1 and the station number of that actual station is set as the reference address 110 regarding the receiving channel RXDA2. Therefore, by the processing of the step 204, it is detected that the information demodulated by the modulation/demodulation section 20 is the token, and by the processing of the step 304, it is detected that the information is data addressed to that particular station. When the detection is made in the step 204 or 304 by the comparison, an interrupt request is generated to the CPU 24 by the interrupt processing section 38 in the subsequent step 206 or 306.

In compliance with this interrupt request, the CPU 24 discontinues the processing of a main routine and starts the interrupt processing. That is, when the interrupt request is generated by the interruption processing section 38, an interrupt control section 42 of the CPU 24 switches the processing from a main routine processing section 44 to an interrupt processing section 46.

Concretely, before the occurrence of the interruption, the CPU 24 executes the main routine shown in FIG. 4. That is, it carries out data exchange with an application region (400), the analysis of commands from the application region (402), the delivery of a response to the application region (404), and the analysis and processing of the received data (406). When the interrupt request is generated by the interrupt processing section 38 of the communication control section 14, the processing of the main routine is discontinued by the operation of the interrupt control section 42, and the processing of the interrupt processing section 46, i.e., interrupt processing shown by numerals 500 to 504 in FIG. 4 are conducted. In the step 500, the received data is read from the data storage section 22 by the CPU 24, and in the step 502, a receiving completion processing and preparation for the next receiving are conducted. In the step 504, the interrupt processing ends and the processing returns to the main routine.

As described above, in the present embodiment, the address search of a frame regarding a token and data is conducted by the use of a plurality of channels of the receiving channels RXDA1 and RXDA2, and therefore it is no longer necessary for the CPU 24 to execute the judgement processing as to whether or not the frame is addressed to that station itself by software means. Thus, a look-up table system is established by the decrease of interrupt frequency and the simplification of an interrupt processing content, and owing to this look-up table system, there can be obtained effects such as the load relief of the CPU 24 and the improvement of processing performance of the whole device. Furthermore, these receiving channels RXDA1 and RXDA2 can be used as hardware (in an exclusive state). In addition, priority can be assigned, and for example, the interrupt of the token can have priority over the interrupt of the data.

What is claimed is:

1. A communication device used as at least one of a plurality of stations coupled together via a communication medium constituting a communication network, the communication device comprising:
   a) processing means for conducting communication processing; and
   b) interrupt means for requesting an interruption processing from the processing means, wherein the interruption means includes:
      (i) a demodulator being coupled to the communication medium and outputting data from the communication medium as a first output and as a second output;
      (ii) a first receiving channel receiving said first output of the demodulator and having a first address extractor for extracting an address from the data demodulated by the demodulator and received from said first output, having a first buffer in which a first reference address is stored and having a first address comparator for judging whether a frame received via the demodulator through the communication medium is a media access control frame for maintenance and control of normal communication by comparing the address extracted by the first address extractor with the first reference address;
      (iii) a second receiving channel receiving said second output of the demodulator and having a second address extractor for extracting an address from the data demodulated by the demodulator and received from said second output, having a second buffer in which a second reference address is stored and having a second address comparator for judging whether a frame received via the demodulator through the communication medium is a logical link control data frame for data transmission addressed to the communication device by comparing the address extracted by the second address extractor with the second reference address; and
      (iv) interrupt request means for requesting, from the processing means interruption processing regarding the media access control frame when the first receiving channel judges that the frame received via the demodulator through the communication medium is the media access control frame and for requesting interrupt processing regarding the logical link control frame when the second receiving channel judges that the frame received via the demodulator through the communication medium is the logical link data control frame.

2. The communication device according to claim 1 wherein the processing means further comprises:

first processing routine means for conducting usual processing inclusive of reception and transmission of commands and data between the processing means and an application device as well as the analysis of the commands and data;

second processing routine means for conducting reception processing inclusive of the extraction of the data from the frame received through the communication medium and the processing of preparation for the next reception processing; and control means for discontinuing the usual processing by the first processing routine means and conducting the reception processing by the second processing routine means, when the interrupt processing is requested.

3. A communication device used as at least one of a plurality of stations constituting a communication network, the communication device comprising:

a) processing means for conducting communication processing; and b) interrupt means for requesting an interruption processing from the processing means, the interruption means including:

(i) a first communication channel, in connection with a communication medium, for judging whether a frame received through the communication medium is a media access control frame for the maintenance and control of normal communication;

(ii) a second communication channel, in connection with the communication medium, for judging whether a frame received through the communication medium is a logical link control data frame for data transmission addressed to the communication device; and (iii) interrupt request means for requesting, from the processing means the interruption processing regarding the media access control frame when the first communication channel judges that the frame received through the communication medium is the media access control frame and for requesting the interrupt processing regarding the logical link control frame when the second communication channel judges that the frame received through the communication medium is the logical link data control frame, wherein the frame on the communication medium contains a destination address;

c) the first communication channel has means for separating the destination address from the frame received through the communication medium, and means for comparing the destination address with a first reference address to judge whether the frame received through the communication medium is the media access control frame;

d) the second communication channel has means for separating the destination address from the frame received through the communication medium, and means for comparing the destination address with a second reference address to judge whether the frame received through the communication medium is the logical link control data frame addressed to the communication device; and e) the processing means has means for setting a specific address indicating the media access control frame to the first reference address, and for setting a communication device address inherent in the communication device to the second reference address.

4. A receiving interruption method conducted by one of a plurality of stations constituting a communication network, the method comprising the steps of:

a) receiving a frame transmitted via a communication medium, wherein the frame is received by one of a first and a second communication channel constituting the station;

b) judging in the first communication channel whether the frame is a media access control frame for the maintenance and control of normal communication by performing the substeps of:

(i) extracting an address from the frame; and (ii) comparing a first reference address stored within the first communication channel with the address extracted from the frame in the first communication channel;

c) judging in the second communication channel whether the frame is a logical link control data frame for data transmission by performing the substeps of:

(i) extracting an address from the frame; and (ii) comparing a second reference address stored within the second communication channel with the address extracted from the frame in the second communication channel; and c) requesting the processing means to conduct an interruption processing regarding the media access control frame when the first communication channel judges that the frame received through the communication medium is the media access control frame and for requesting an interruption processing regarding the logical link control frame when the second communication channel judges that the frame received through the communication medium is the logical link data control frame.

* * * * *